UNITED STATES PATENT OFFICE.

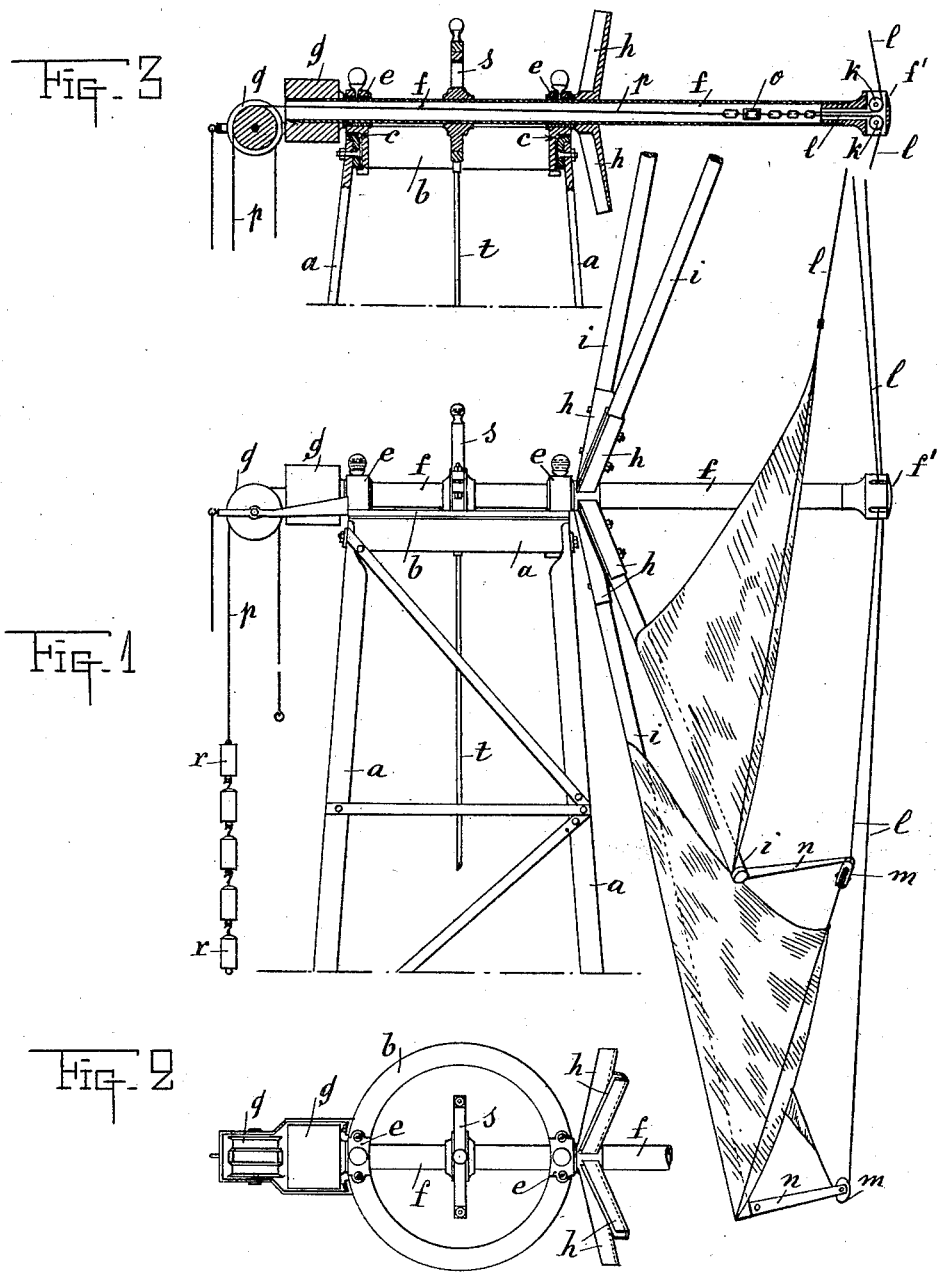

RAPHAËL BRUNEAU, OF ORAN, FRANCE.

WINDMILL.

SPECIFICATION forming part of Letters Patent No. 704,507, dated July 15, 1902.

Application filed October 4, 1901. Serial No. 77,511. (No model.)

*To all whom it may concern:*

Be it known that I, RAPHAËL BRUNEAU, a citizen of the Republic of France, and a resident of 10 Rue De Genes, Oran, Algeria, in the Republic of France, have invented a certain new and useful Improvement in Windmills or Wind-Rotated Engines, of which the following is a specification, such as will enable others skilled in the art to which it appertains to make and use the same.

The new system of mill which forms the subject of the present application has the advantage that the mill automatically takes its proper position in regard to the direction of the wind and regulates its own proper speed. In order that its construction and operation may be better understood, I have illustrated it by way of example in the accompanying drawings, in which—

Figure 1 is a front view of the parts of the mill to which it refers. Fig. 2 is a plan of the same, the sail-arms being omitted. Fig. 3 shows an elevation and vertical section of the platform and shaft.

As shown in the figures, the mill is formed of a metal standard or support $a$, upon the top of which a platform $b$ rests, which is free to revolve upon antifriction-balls at $c$, Fig. 3. Upon this platform $b$ are fixed two lubricating-bearings $e$, in which a hollow shaft $f$ revolves freely. Outside these bearings the shaft is provided at one end with a counterweight $g$, intended to balance a sufficient part of the weight of the arms and sails of the mill which are carried upon the shaft outside and against the other bearing $e$.

Upon the hollow shaft $f$ is fixed the center for the sails, which is formed of a metal nave, in which are cast grooves or recesses $h$, radiating toward the center. In each of these recesses is fitted and fixed, by means of bolts and nuts, one of the sail-arms $i$, the recesses and arms being somewhat oblique, so as to escape the standard $a$. The end of the shaft $f$ opposite to the counterweight $g$ carries a head $f'$, suitably hollowed and shaped to receive pulleys $k$, as many in number as the sail-arms, and these pulleys receive a stay or cord $l$, which is fixed to the end of an arm after passing around a pulley $m$, the distance between which and the neighboring arm is preferably regulated either by a rigid attachment, as shown at $n$, or by cords. From the pulleys $k$ the stays or cords $l$ are brought around a swivel $o$, which, on the other hand, is provided with a rope $p$, passing over a pulley $q$ and having suspended to its free end a weight $r$, greater or less, according to the greater or less power of the mill which it is desired to obtain, as hereinafter explained.

To each sail-arm is fixed a sail of suitable shape, which is also attached to the corresponding stay, and these sails, together with their arms, form the complete wind-wheel of the windmill.

By this system when the wind is normal the shaft turns with a fixed and regulated speed. If the wind becomes stronger, the sails yield, raising the counterweights $r$, the speed remaining the same. As regards the direction of the sails to the wind, it will be easily understood that the wind striking the sails from behind in opposition to other known systems—that is to say, first passing over the mill—the position of the sails to the wind will always be adjusted automatically.

Upon the hollow shaft $f$ between the bearings $e$ I have shown by way of example an eccentric movement $s$, intended to give an alternating vertical movement to a rod $t$; but I reserve the right to use any other means, such as a crank-axle, gear, &c.

I claim as my exclusive property "a new system of windmill" characterized by—

The combination with a standard of a revolving platform supported upon antifriction-balls carried by the standard, a hollow shaft turning freely in two bearings fixed upon the platform, a hollow counterweight secured at one end of the hollow shaft, a center secured to the other end of the hollow shaft, sail-arms secured to the center, sails of flexible material secured to the arms at the base, stays and cords secured at one end to the points of the triangular sails passing thence over pulleys secured at the ends of rigid arms secured to the ends of the arms and extending outward therefrom at an angle and thence over other pulleys in the end of the hollow shaft, a swivel secured to the ends of the stays or cords, a cord $p$ secured to the swivel and passing thence out through the hollow shaft and counterweight and over a pulley carried by the hollow shaft, and a plurality of removable weights secured to the end of the cord $p$, substantially as shown and described.

In testimony that I claim the foregoing I have hereunto set my hand this 16th day of September, 1901.

RAPHAËL BRUNEAU.

Witnesses:
GASTON ABEL COURCELLE,
ALBERT LEBHAR.